Figure 1:
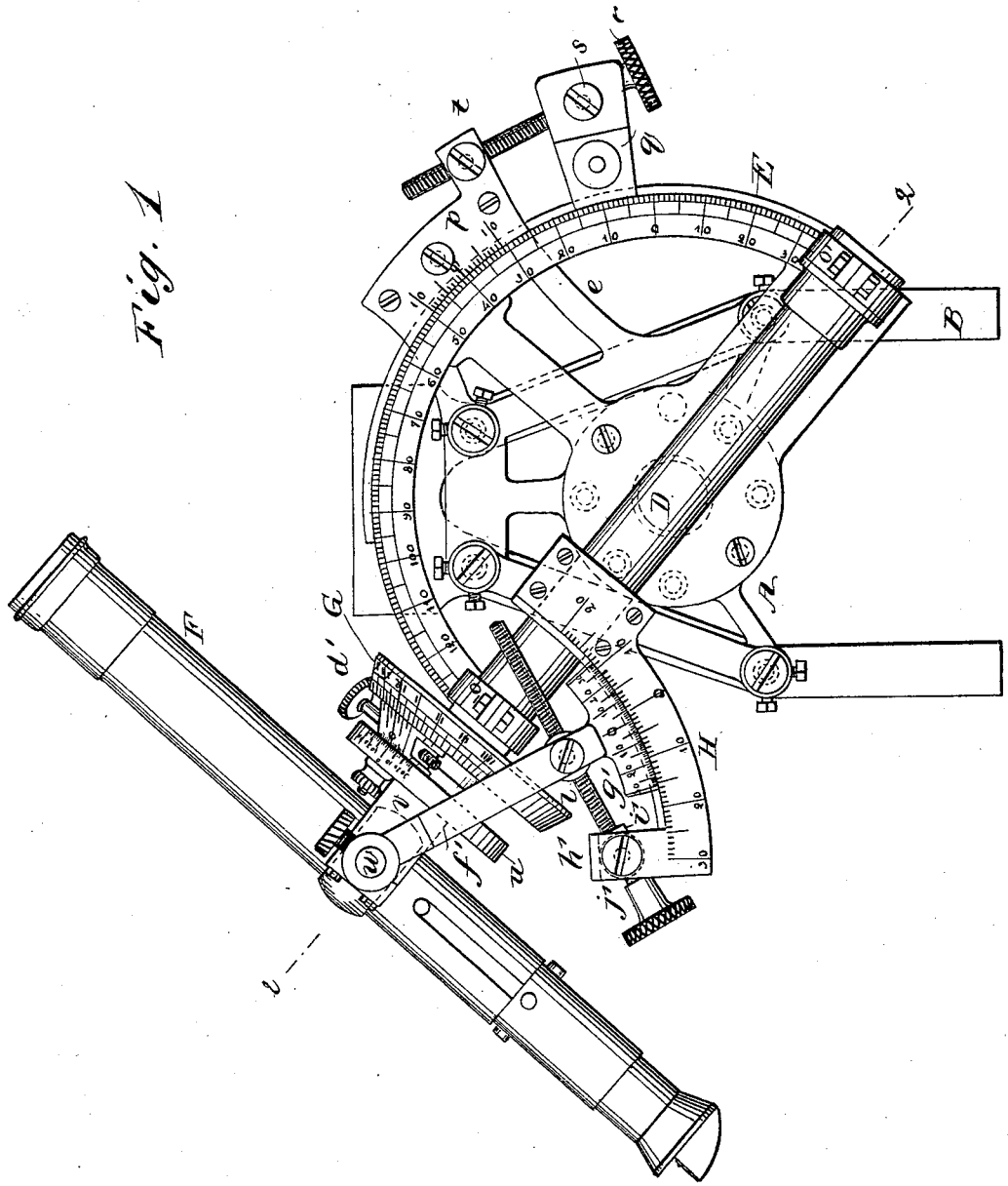

(No Model.) 3 Sheets—Sheet 1.

P. STOLLER.
SOLAR ATTACHMENT FOR TELESCOPES.

No. 583,518. Patented June 1, 1897.

WITNESSES:
C. Neveux
C. Sedgwick

INVENTOR
P. Stoller
BY Munn & Co
ATTORNEYS.

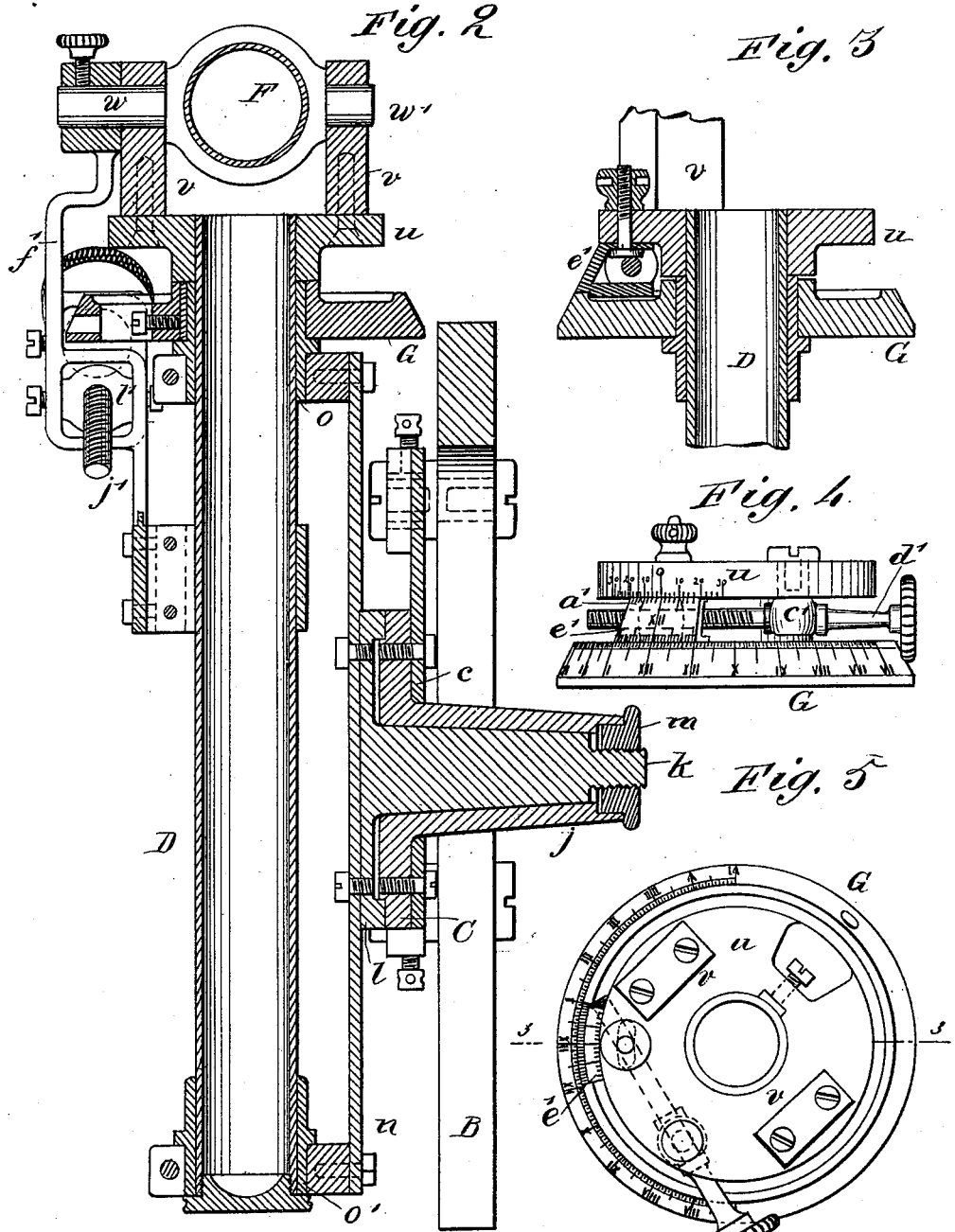

(No Model.) 3 Sheets—Sheet 3.
P. STOLLER.
SOLAR ATTACHMENT FOR TELESCOPES.
No. 583,518. Patented June 1, 1897.
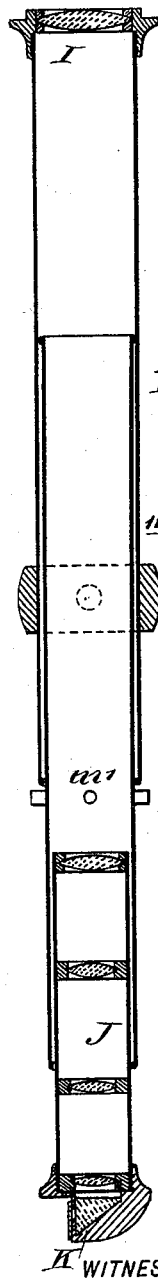
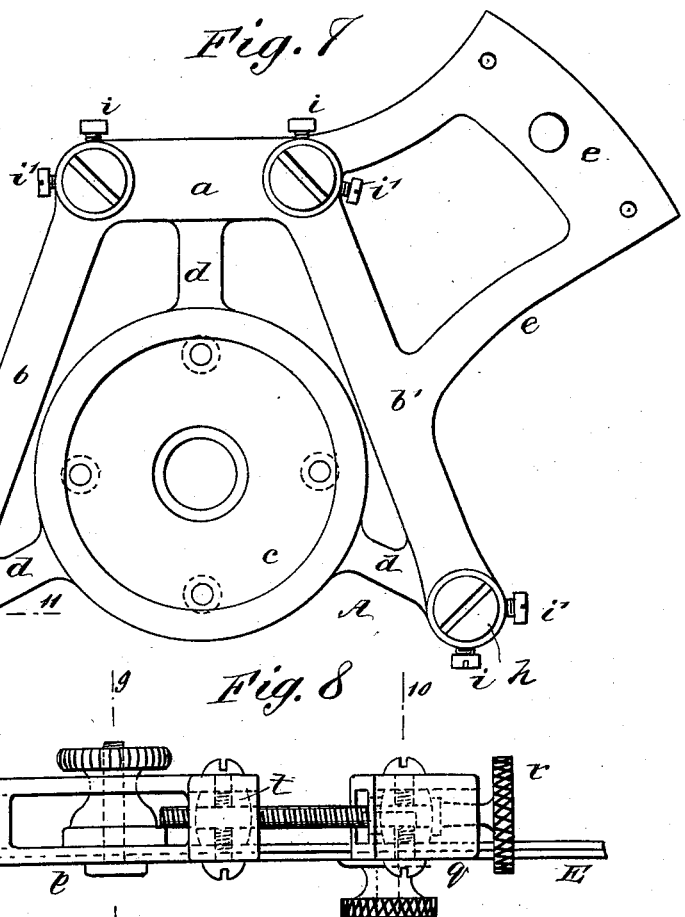
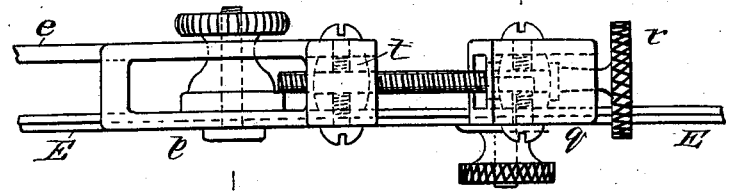
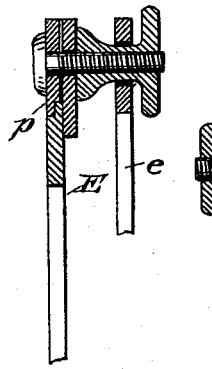
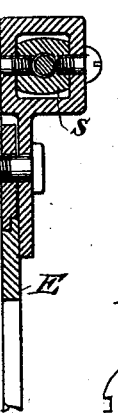
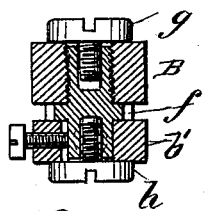
WITNESSES:
C. Neveux
C. Sedgwick
INVENTOR
P. Stoller
BY
Munn & Co.
ATTORNEYS.
THE NORRIS PETERS CO., PHOTO-LITHO., WASHINGTON, D. C.

UNITED STATES PATENT OFFICE.

PETER STOLLER, OF PITKIN, COLORADO.

SOLAR ATTACHMENT FOR TELESCOPES.

SPECIFICATION forming part of Letters Patent No. 583,518, dated June 1, 1897.

Application filed August 16, 1893. Renewed October 20, 1896. Serial No. 609,481. (No model.)

*To all whom it may concern:*

Be it known that I, PETER STOLLER, of Pitkin, in the county of Gunnison and State of Colorado, have invented a new and Improved Solar Attachment for Telescopes, of which the following is a specification, reference being had to the annexed drawings, forming a part thereof, in which—

Figure 1 is a side elevation of my improved solar attachment. Fig. 2 is a central vertical section of the attachment, the polar axis being also vertical. Fig. 3 is a transverse section of the hour-circle, taken on line 3 3 in Fig. 5. Fig. 4 is a side elevation of the hour-circle, showing the sun-time arc and vernier. Fig. 5 is a face view of the hour-circle, showing the vernier. Fig. 6 is a longitudinal section of the telescope. Fig. 7 is a side elevation of the frame of the attachment. Fig. 8 is a side elevation of the vernier attachment of the latitude-arc. Fig. 9 is a transverse section taken on line 9 9 in Fig. 8. Fig. 10 is a transverse section taken on line 10 10 in Fig. 8. Fig. 11 is a transverse section taken on line 11 11 in Fig. 7, and Fig. 12 is an end view of one of the studs connecting the attachment with the telescope-stand.

Similar letters of reference indicate corresponding parts in all the views.

The object of my invention is to construct an attachment for telescopes, more especially the kind of telescopes used by engineers for making observations for the purpose of taking time or for determining the latitude of a place, the time being known.

My invention consists in a telescope mounted equatorially on a frame constructed for attachment to the standard of an engineer's transit or to any other suitable telescopic stand, the said telescope being provided with adjustments for latitude and for hour angle and declination, with verniers connected with each adjustment, all as will be hereinafter more fully described.

The frame A, by which the several parts of the attachment are supported, is formed of a cross-bar $a$, with divergent arms $b\ b'$, formed integrally therewith, the circular portion $c$, connected by arms $d$ with the bar $a$ and divergent arms $b\ b'$, and the side arm $e$, projecting from one arm $b'$. The frame A is connected with one side of the transit-frame B by studs $f$, screwed into the transit-frame and further secured by cap-screws $g$. The outer ends of these studs are inserted in apertures in the frame A, which is held in place by cap-screws $h$, inserted in the outer ends of the studs. The outer ends of the said studs are smaller than the apertures in which they are inserted, and in each angle of the frame A are inserted adjusting-screws $i\ i'$, arranged at right angles to each other and bearing on the stud $f$, the said screws being used for adjusting the frame A on the studs.

To the circular portion $c$ of the frame A is attached a disk C, provided with a conical sleeve $j$, and to the said sleeve is fitted a trunnion $k$, carrying a disk $l$, which is fitted to the face of the disk $c$. The trunnion $k$ is held in place in the sleeve $j$ by the nut $m$, screwed in the threaded end of the trunnion and bearing against the end of the sleeve $j$. To the disk $l$, carried by the trunnion $k$, is attached a bar $n$, to which are secured bearings $o\ o'$ of the polar axis D, and also the graduated circle E, which moves across the face of the arm $e$ and adjoins the vernier-scale $p$, attached to the said arm $e$. To the circle E is secured an arm $q$, in which is journaled the tangent-screw $r$ in a pivoted stud $s$, and the said screw turns in a swivel-nut $t$, attached to the vernier $p$.

The polar axis D consists of a tube having at the end a collar $u$, to which are attached apertured standards $v$ for receiving the trunnions $w\ w'$ of the telescope F. On the sleeve $o$, forming one of the bearings of the polar axis D, is mounted a disk G, having graduations upon its edge, and to the collar $u$ is secured a vernier $a'$, which is used in conjunction with the scale upon the edge of the disk G. In the collar $u$ is pivoted a stud $c'$, in which is journaled a tangent-screw $d'$, the said screw being inserted in a nut $e'$, pivoted to the disk G. The graduations on the periphery of the disk G are in degrees and seconds or in hours and minutes.

The collar $u$ for indicating slow or fast sun has a scale of thirty minutes each way from a center line drawn directly over the twelve o'clock line on the hour-circle G. This is thirty minutes of time or one-half hour each way. The small vernier $a'$ is graduated at the upper edge to read to thirty seconds of time for the purpose of compensating for the fast or slow time of the sun. To illustrate the object of the arc or scale, July 13, 1893, when the sun has lost five minutes 30.76 seconds, the vernier $a'$ should then be set five minutes and thirty seconds to the left, as seen in the drawings. This will bring the vernier $a'$ to meridian time on the disk G, or to reverse the operation take September 13, 1893, when the sun has gained on meridian time four minutes 16.69 seconds, the vernier $a'$ should then be set four minutes fifteen seconds to the right to show meridan time on the disk G.

To the axis D is secured a scale H, and to the trunnion $w$ is attached an arm $f'$, carrying at its free end a vernier $g'$, and to an arm $h'$, formed on the end of the scale H, is pivoted a stud $i'$, in which is journaled the screw $j'$, which passes through a nut $l'$, pivotally connected with the arm $f'$.

The telescope F is of any approved construction and provided with an achromatic objective I, an erecting eyepiece J, and a right-angled prism K for changing the direction of the beam passing through the eyepiece. The telescope F is provided with the usual cross-wires $m'$. The vernier $a'$, used in connection with the scale on the edge of the disk G, is made adjustable on the collar $u$. The collars of the studs $f$, which are used to clamp the frame A to the standard B of the transit, are provided with notches in their peripheries for receiving a spanner for screwing the stud into place.

To adjust my improved attachment for use, the circle E is adjusted for the latitude of the location in which the instrument is used and the plane of the circle is adjusted to the meridian by setting the sun's declination-circle, then setting the time on the disk G and vernier $a'$. The polar adjustment is completed by means of the adjusting-screw $r$.

The telescope F is adjusted on its trunnions by the declination-scale H, the adjustment being effected by the screw $j'$. By turning the telescope on the sun and observing the position of the scale $a'$ relative to the scale on the disk G the time may be taken. The fine adjustment of the telescope in hour-angle is effected by the adjusting-screw $d'$.

It is obvious that if the time of day be known the telescope may be directed to the sun and the latitude may be found by the reversal of the operation just described.

Having thus described my invention, I claim as new and desire to secure by Letters Patent—

1. In a solar attachment for engineers' transits, the combination of an equatorially-mounted telescope provided with adjustments for the purposes specified and furnished with an hour-circle, a sun-time arc and intermediate vernier, substantially as specified.

2. The combination, of the frame A provided with the arm $e$, the conical sleeve $j$, the trunnion $k$ fitted to the said sleeve, the cross-arm $n$ carrying the bearings $o$ $o'$ for the polar axis D, the disk G mounted on the bearing of the polar axis, the polar axis D, the collar $u$ mounted thereon, and provided with standards $v$, the telescope F provided with trunnions journaled in the standards, and the scales for the two adjustments specified, substantially as specified.

3. The combination, with the frame A, transit-standard B, a central pivot bearing on the latter, of the studs $f$ provided with notched collars and bored and internally threaded at opposite ends, the cap-screws $g$, $h$, and the adjusting-screws $i$, $i'$, substantially as specified.

4. In a solar attachment for an engineer's transit, the combination of the frame A provided with the arm $e$, the arm $n$ furnished with the trunnion $k$ and with bearings $o$ $o'$, the circle E, the vernier $p$, the arm $q$, and the adjusting-screw $r$ for adjusting the instrument for use in any latitude, substantially as specified.

PETER STOLLER.

Witnesses:
 JOHN DEMPSEY,
 JAMES H. BALSER.